United States Patent
Sun et al.

(10) Patent No.: US 7,106,441 B2
(45) Date of Patent: Sep. 12, 2006

(54) STRUCTURE AND METHOD FOR A MICROELECTROMECHANIC CYLINDRICAL REFLECTIVE DIFFRACTION GRATING SPECTROPHOTOMETER

(75) Inventors: Decai Sun, Los Altos, CA (US); Joel A. Kubby, Rochester, NY (US); Jingkuang Chen, Rochester, NY (US); Alex T. Tran, Madison, NJ (US); Patrick Y. Maeda, Mountain View, CA (US)

(73) Assignee: Xerox Corporation, Stamford, CT (US)

( * ) Notice: Subject to any disclaimer, the term of this patent is extended or adjusted under 35 U.S.C. 154(b) by 340 days.

(21) Appl. No.: 10/672,207

(22) Filed: Sep. 26, 2003

(65) Prior Publication Data

US 2004/0145738 A1 Jul. 29, 2004

Related U.S. Application Data

(60) Provisional application No. 60/421,933, filed on Oct. 28, 2002.

(51) Int. Cl.
*G01J 3/20* (2006.01)

(52) U.S. Cl. .......................................... 356/328
(58) Field of Classification Search ............... 356/319, 356/326, 328, 334
See application file for complete search history.

(56) References Cited

U.S. PATENT DOCUMENTS

| 6,249,346 B1 | 6/2001 | Chen et al. | 356/328 |
| 6,295,130 B1 | 9/2001 | Sun et al.  | 356/454 |

OTHER PUBLICATIONS

Kiang, Meng–Hsiung, Solgaard, Olav, Muller, Richard, Lau, Kam: Micromachined Polysilicon Microscanners for Barcode Readers, IEEE Photonics Technology Letters, Dec. 1996, pp. 1707–1709, vol. 8, No. 12.

Born, Max, Wolf, Emil: Electromagnetic Theory of Propagation, Interference and Diffraction of Light, Principles of Optics, Pergamon Press, 1975, Fifth Edition pp. 412–414.

*Primary Examiner*—F. L. Evans

(57) ABSTRACT

A tunable microelectromechanical (MEMS) spectrophotometer with a rotating cylindrical reflective diffraction grating is integrated with a photodetector and an optical fiber light source on a Rowland circle on a monolithic silicon substrate.

16 Claims, 3 Drawing Sheets ize cameras, color control for xero-
STRUCTURE AND METHOD FOR A MICROELECTROMECHANIC CYLINDRICAL REFLECTIVE DIFFRACTION GRATING SPECTROPHOTOMETER This application claims the benefit of Provisional Patent Application No. 60/421,933, filed Oct. 18, 2002.

This invention was made with United States Government support awarded by the Department of Commerce under Contract No. 70NANB8H4014. The United States Government has certain rights in this invention.

BACKGROUND OF THE INVENTION

The present invention relates to a microelectromechanical (MEMS) spectrophotometer and, more particularly, to a MEMS cylindrical reflective diffraction grating spectrophotometer.

Spectrophotometers are optical instruments which separate optical signals according to their wavelengths. They have broad applications including color identification in flat panel displays or electronic cameras, color control for xerographic printing, optical spectroscopy for chemical analysis, environmental monitoring, and process controls which are related to color identification. To date, commercial spectrophotometers tend to be of rather large size because they are formed by assembling bulky optical elements, mechanical parts, detectors, and microelectronic chips into a system. The present day assembly process needs high precision and is labor intensive, keeping the cost of conventional bench top spectrophotometers from being affordable.

Many additional applications of interest arise if spectrophotometers were significantly lower cost, lighter weight, smaller size, rugged, and incorporated signal processing capability in the instrument. In xerographic printing, a spectrophotometer is a key component in a closed-loop color control system which will enable the printers to generate reproducible color images in a networked environment. The development of a compact, low cost spectrophotometer is thus important in realizing high performance printing systems.

With the advance of micromachining technology, it is now possible to build various microstructures, movable mechanical components, micro optical elements, including free-space, out-of-plane lenses and gratings, sensors, and electronic circuits on silicon chips using modified IC processes that are able to produce thousands of these devices in batch on silicon wafers. Over the past decade, much effort has been devoted to the development of micro spectrophotometers using MEMS technology.

A microelectromechanical spectrophotometer having a Fabry-Perot cavity filter is taught in U.S. Pat. No. 6,295,130, commonly assigned with the present application and herein incorporated by reference. The Fabry-Perot cavity thickness is tuned electrostatically to resolve the spectral distribution of the transmitted light signal to make a color sensing system.

A MEMS spectrophotometer with a stationary concave grating formed in a monolithic substrate is disclosed in U.S. Pat. No. 6,249,346, commonly assigned with the present application and herein incorporated by reference. The stationary grating focuses light on a movable photodiode array It is an object of this invention to provide a MEMS spectrophotometer with a rotating cylindrical reflective diffraction grating on a Rowland circle.

SUMMARY OF THE INVENTION

According to the present invention, a tunable MEMS spectrophotometer with a rotating cylindrical reflective diffraction grating is integrated with a photodetector and an optical fiber light source on a Rowland circle on a monolithic silicon substrate.

A light beam from the optical fiber light source will be scattered by wavelength by the reflective diffraction grating and imaged onto the photodetector. The reflective diffraction grating will be rotated so that the photodetector can measure the spectral distribution of the light beam.

Within the MEMS structure, the optical fiber light source will be positioned on a mount. The reflective diffraction grating will be bent to cylindrical shape by a bimorph layer. The cylindrical reflective diffraction grating will be positioned and rotated by an electrostatic comb drive. The photodetector will be p-i-n photodiode.

Other objects and attainments together with a fuller understanding of the invention will become apparent and appreciated by referring to the following description and claims taken in conjunction with the accompanying drawings.

DESCRIPTION OF THE INVENTION

Figure 1:
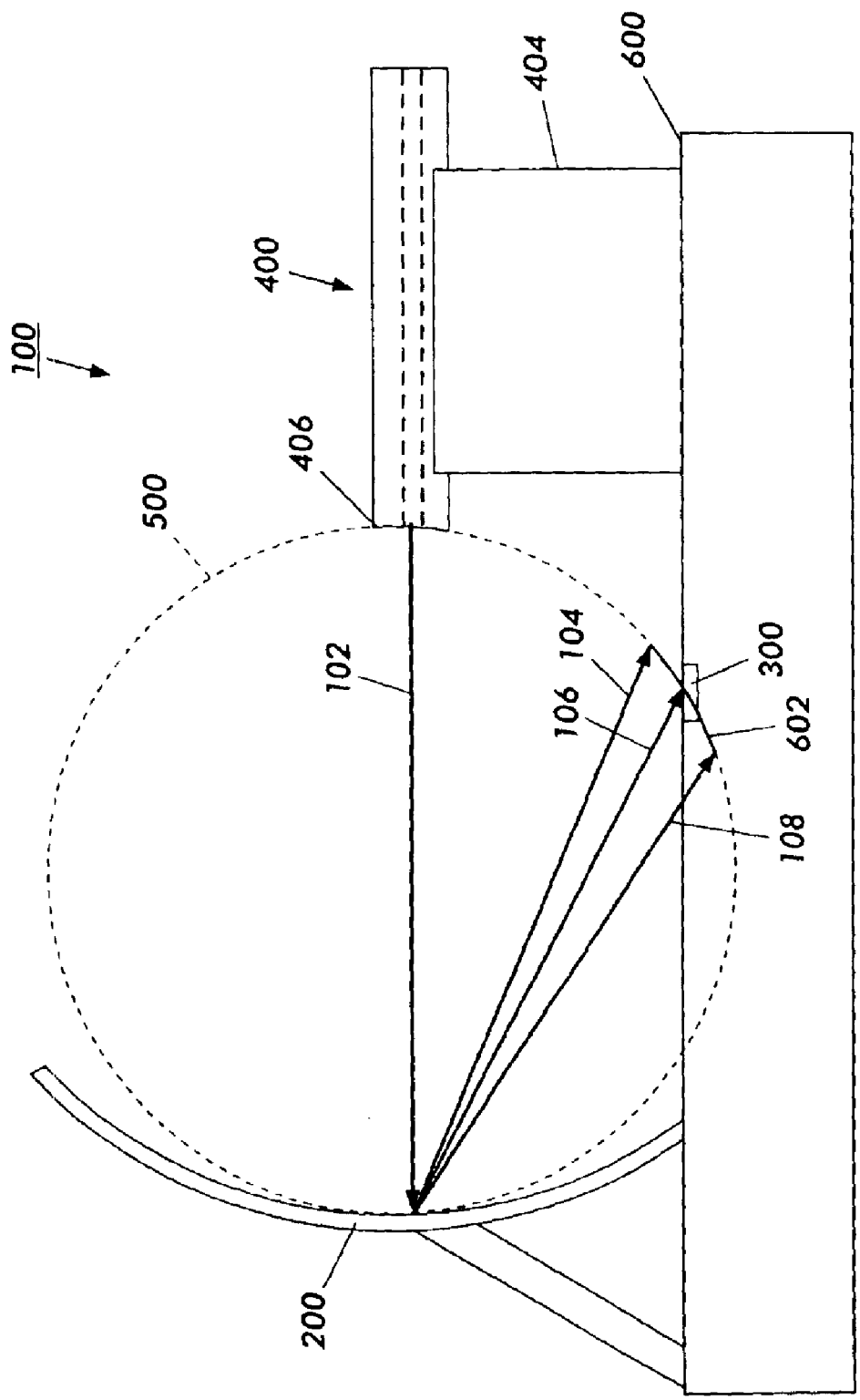
FIG. 1 is a side view of the MEMS spectrophotometer with a rotating cylindrical reflective diffraction grating on a Rowland circle of the present invention.

Reference is now made to FIG. 1, wherein there is illustrated the tunable MEMS spectrophotometer 100 with a rotating cylindrical reflective diffraction grating 200 integrated with a photodetector 300 and an optical fiber light source 400 on a Rowland circle 500 on a monolithic silicon substrate 600 in accordance with this invention.

A light beam 102 from the optical fiber light source 400 will be scattered by wavelength by the reflective diffraction grating 200 and imaged onto the photodetector 300. The reflective diffraction grating 200 will be rotated so that the photodetector 300 can measure the spectral distribution and intensity of the light beam 102.

The diffraction grating 200, the optical fiber mount 400 and the photodetector 300 are all fabricated on the same monolithic silicon substrate 600.

Figure 2:
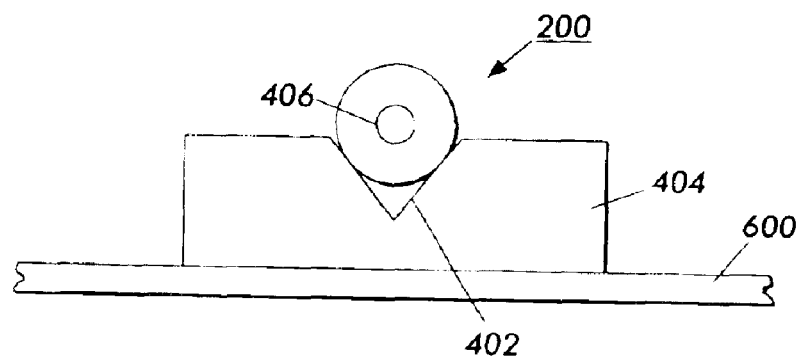
FIG. 2 is a front view of the optical fiber mount of the MEMS spectrophotometer of FIG. 1.

The single mode optical fiber 400, as seen in FIG. 2, is mounted in a v-groove 402 etched into a mount 404 etched from and on the silicon substrate 600. The etching can be done by reactive ion etching. The optical fiber 400 will be bonded to the groove 402. A convex lens (not shown) may be mounted at the emission end 406 of optical fiber 400 to collimate the light before the light enters the MEMS spectrophotometer 100. The convex lens may be formed either by pulling the end of optical fiber 400 into a lens shape after melting or a microlens may be attached with an ultraviolet cured epoxy which has a refractive index matching optical fiber 400 and the microlens.

The input light beam 102 will be coupled into the MEMS spectrophotometer 100 through the single mode optical fiber 400 at emission end 406, as shown in FIG. 1. In preferred embodiments, the input light beams are received from optical elements (not shown) directed toward color images (not shown) such as may be created by xerographic or inkjet printers. In xerographic printing, a MEMS spectrophotometer 100 in accordance with the present invention is a component of a closed-loop color control system (not shown) that enables the printer to generate reproducible color images in a networked environment.

Figure 3:
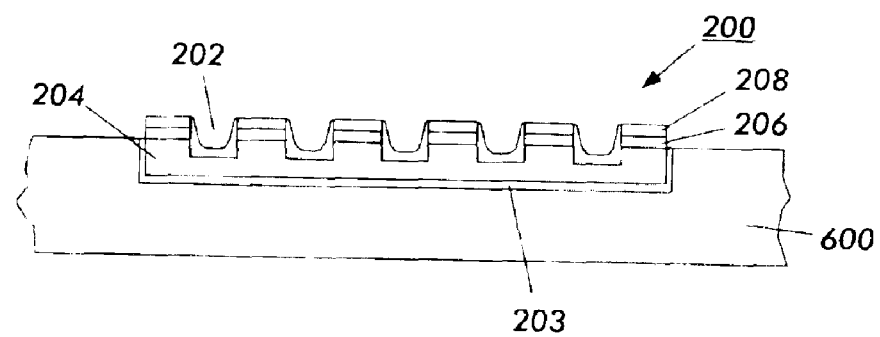
FIG. 3 is a side view of the reflective diffraction grating in the monolithic silicon substrate of the present invention

Conventional surface MEMS design and fabrication including polysilicon deposition and etching or silicon-on-insulator wafer material together with conventional lithography steps for pattern definition may be used for making the cylindrical reflective diffraction grating 200, as shown in FIG. 3.

The grooves 202 for the diffraction grating are formed on a silicon layer 204 in the silicon substrate 600 by photolithography, then etching. The grooves 202 are straight, parallel, and equally spaced. The grooves are not shown to scale in the Figure for ease of understanding. The grooves 202 form the diffraction grating of the cylindrical reflective diffraction grating 200. Finer pitch grooves can be fabricated by ultraviolet lithography or direct write e-beam.

After fabrication of the grooves 202, a bimorph or tensile strained chromium (Cr) or molybdenum chromium (MoCr) layer 206 is deposited on the silicon layer 204. The grooves 202 of the silicon layer 204 will be maintained in the bimorph layer 206 without being filled in.

After deposition of the bimorph layer 206, a gold (Au) or aluminum (Al) reflective layer 208 is deposited on the bimorph layer 206 by either thermal deposition or RF sputtering techniques in order to enhance the optical reflection characteristics of the cylindrical reflective diffraction grating 200. The grooves 202 of bimorph layer 206 and silicon layer 204 will be maintained in the reflective layer 208 without being filled in.

Figure 4:
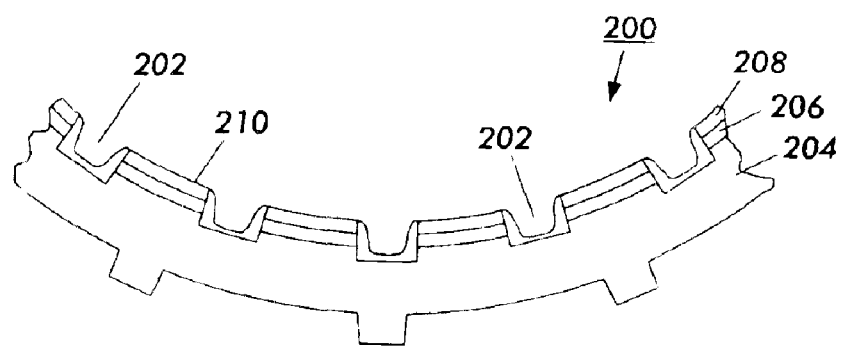
FIG. 4 is a side view of the reflective diffraction grating of the present invention.

The silicon layer 204 is then etched and released from the silicon substrate 600, as shown in FIG. 4. The bimorph layer 206 has a built in stress gradient in the thickness direction varying from compressive on the side of the layer 206 adjacent to the reflective layer 208 to tensile on the other side of layer 206 next to silicon layer 204. After silicon layer 204 is released from substrate 600, the stress gradient in bimorph layer 206 causes the released silicon layer 204 to bend to form the cylindrical reflective diffraction grating 200. The bimorph layer 204 forms the cylindrical shape of the cylindrical reflective diffraction grating 200.

The diffraction grating 200 will bend in one common axis, normal to the grooves 202. The diffraction grating 200 is a cylindrical grating with grooves 202 which are straight, parallel and equally spaced along a chord of the concave reflective surface 210.

The curvature of reflective diffraction grating 200 is determined by the stress gradient in bimorph layer 206 and the thickness of silicon layer 204. Increasing the stress gradient in bimorph layer 206 and decreasing the thickness of silicon layer 204 increases the curvature of cylindrical reflective diffraction grating 200. Decreasing the stress gradient in bimorph layer 206 and increasing the thickness of silicon layer 204 decreases the curvature of cylindrical reflective diffraction grating 200.

Reinforcing beams 212 parallel to a common axis can be present underneath silicon layer 204 to prevent cylindrical reflective diffraction grating 200 from bending in the direction perpendicular to the common axis.

Figure 5:
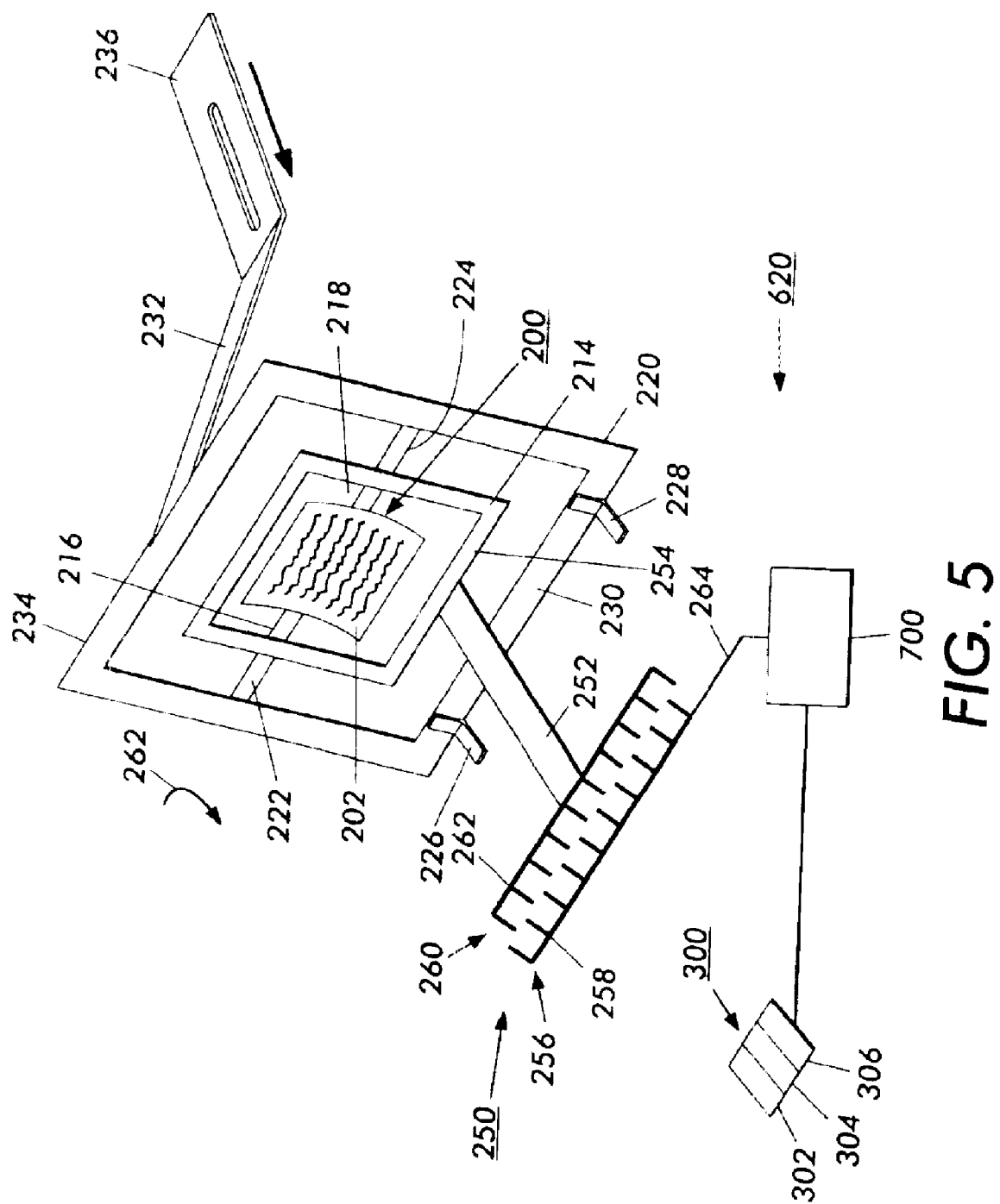
FIG. 5 is a perspective view of the MEMS spectrophotometer of FIG. 1 with a comb drive actuator and a photodetector of the present invention.

As shown in FIG. 5, the cylindrical reflective diffraction grating 200 is attached at its midpoints along the curved sides to a first inner silicon frame 214 by a set of secure, inflexible beams 216 and 218 which are in the middle on the right and left sides of the first silicon frame 214, parallel to the grooves 202 of the diffraction grating 200. The first inner silicon frame 214 is attached to a second outer silicon frame 220 by a set of flexible torsion hinges 222 and 224 which are in the middle on the right and left sides of the second outer silicon frame 220, parallel to the inflexible beams 216 and 218.

The frames 214 and 220, beams 216 and 218 and hinges 222 and 224 will be formed in the silicon substrate 600. After etching and release from the silicon substrate, a pair of hinges 226 and 228 on the bottom side 230 of the second outer frame 220 and a back support 232 on the top side 234 of the second frame 220 allows the frame to be erected by a slider actuator 236 connected to the back support 232 and the silicon substrate 600. The back support 232 and slider actuator 236 have also been formed in the silicon substrate 600, then etched and released.

The angular position of the cylindrical reflective diffraction grating 200 relative to the monolithic substrate 600 is adjustable with the slider actuator 236. The cylindrical reflective diffraction grating 200 will be positioned by the slider actuator 236 in the Rowland circle of the MEMS spectrophotometer 100.

An electrostatic comb drive 250 is connected by a drive actuator 252 to the bottom side 254 of the inner frame 214. The comb drive 250 is a common mechanism for electrostatically driving microstructures. The comb drive 250 has a first set 256 of a plurality of comb fingers 258 and a second set 260 of a plurality of comb fingers 262. The first set of comb fingers 258 are interdigitated with the second set of comb fingers 262.

The first set 256 of comb fingers 258 are static fingers attached to the silicon substrate 600 at a comb spine 264.

The second set 260 of comb fingers 262 are moveable fingers attached to the drive actuator 256. The comb drive 250 defines a maximum displacement equivalent to the length of the comb fingers 262 along an axis parallel to the comb fingers 262.

In this preferred embodiment, the comb drive 250 is disposed opposite or linearly adjacent the cylindrical reflective diffraction grating 200 in the inner frame 214, although it will be appreciated that other geometric arrangements may be used without departing from the scope and intent of the subject invention.

Here, the cylindrical reflective diffraction grating 200 is mechanically connected by drive actuator 252 to comb drive 250 so that linear displacement of the second set 260 of comb fingers 262 results in a corresponding displacement of the cylindrical reflective diffraction grating 200.

The comb drive 250 is electrically connected to electrostatic drive signal source controller 700.

The drive actuator 252 is attached to the inner frame 214 which is attached to the cylindrical reflective diffraction grating 200. Movement of the drive actuator 252 will cause the diffraction grating 200 to rotate on beams 216 and 218 of the inner frame.

The drive actuator 252 and the diffraction grating 200 move in a first direction along a motion axis 262 upon an actuation voltage V being applied between the static fingers 258 and the movable fingers 262 of the comb drive 250 by controller 700.

Electrostatic forces cause the movable fingers 262 of the driven comb drive 250 to "pull in" toward the comb spine 256 of the static fingers 258. Since the movable fingers 262 are attached to the drive actuator 252, this electrostatic actuation causes the drive actuator 252 and the diffraction grating 200 to rotate to a new position.

In a first order system, the position of the drive actuator 252 and the diffraction grating 200 will be proportional to the electrostatic force, which is proportional to the square of the actuation voltage V applied to the driven comb drive 250 by controller 700.

The electrostatic comb drive 250 may be replaced with any appropriate known or later developed actuation system. For example, a thermo-actuator, as opposed to an electrostatic actuator such as the comb drive 250, may be used. Also, a scratch drive actuator may be used. However, a scratch drive actuator is slower and provides a larger force than the electrostatic comb drive 250.

Photodetector 300 in FIG. 5 is typically a p-i-n photodiode with the p-i-n junction being formed by either impurity diffusion or ion implantation of the silicon substrate 600. The photodetector 300 has a p-layer 302 (formed from conventional p-type doped or p-ion implanted silicon semniconductive material), an i-layer 304 (formed from conventional intrinsic silicon semiconductive material), and an n-layer 306 (formed from conventional n-type doped or n-ion implanted silicon semiconductive material), that together operate as a p-i-n junction device. When visible light or other type of incident radiation (e.g. ultraviolet, infrared, etc.) strikes a suitably voltage biased photodetector 300, electron-hole charge pairs are generated in the i-layer 304. The electrons are separated from the holes by the electric field between the p-layer and the n-layer, with electrons tending to flow toward the n-layer 306 and holes tending toward the p-layer 302. The electrons in the n-layer then flow to signal processor 700 with currents generated being proportional to total light intensity in the photodetector 300.

Typical response time for photodetector 300 is about $10^{-10}$ seconds compared to the mechanical response times typically on the order of $10^{-6}$ seconds.

Returning to FIG. 1, the cylindrical reflective diffractive grating 200 in the tunable MEMS spectrophotometer 100 is based on the Rowland circle 500, i.e. a circle 500 with a diameter equal to the radius of curvature of the grating 200. If the optical fiber 400 for the entrance of the light beam 102 into the spectrophotometer 100 is located on the Rowland circle 500, then the spectral focus 602 of the light beam's wavelengths after diffraction by the grating 200 will also be on this circle 500. In this manner, the photodetector 300 is positioned at the focal surface 602 on the monolithic silicon substrate 600 to detect, for example, a number of discrete wavelengths from the diffracted light beam 102.

In operation, a light beam 102 is transmitted through the optical fiber 400 into the MEMS spectrophotometer 100. The light beam may be in the ultraviolet, infrared or visible portion of the electromagnetic spectrum to be analyzed by MEMS spectrophotometer 100. The emission end 406 of the optical fiber 400 is on the Rowland circle 500.

The light beam 102 is incident upon the cylindrical reflective diffration grating 200. The cylindrical reflective diffration grating 200 is also on the Rowland circle 500. The grating 20 reflects and diffracts the light beam 102. The diffracted light beam is separated into multiple light beams 104, 106 and 108 of different discrete wavelengths. The multiple diffracted beams 104, 106 and 108 of different discrete wavelengths are all focused onto the Rowland circle 500 along a spectral distribution 602.

The grating equation for the first order of diffraction is expressed as:

$$a\,(\sin\theta_d - \sin\theta_i) = \lambda \qquad \text{Equation 1}$$

where a is the grating pitch, $\theta_d$ is the diffraction angle and $\theta_i$ is the incident angle, and $\lambda$ is the wavelength.

The photodetector 300 and the single mode optical fiber 400 are arranged on a Rowland circle 500 such that the light beam 102 from the optical fiber 400 diffracted by the cylindrical grating 200 is imaged onto the photodetector 300 for the light beam at a specific wavelength.

The comb drive (not shown in this Figure) has positioned the reflective cylindrical grating 200 so that the longest wavelength diffracted light beam 104 is diffracted and imaged onto the photodetector first.

The comb drive will rotate the cylindrical grating to scan the diffracted light beams 104, 106 and 108 across the photodetector 300. As the grating is scanned to increase the incident angle $\theta_i$, the diffraction angle $\theta_d$ for the same wavelength increases, that is, the long wavelength diffracted light beam 104 is moved away from the photodetector 300 and the shorter wavelength diffracted light beam 106 is imaged onto the photodetector. Through the rotation of the grating 200, the spectral distribution 602 of the light can be measured by the photodetector.

Turning to FIG. 5, the rotation of the diffraction grating 200 by the comb drive 250 will be controlled by controller/processor 700 which also processes the detection and intensity measurement of the light beam wavelengths by the photodetector 300. The controller/processor 700 can be etched into the monolithic substrate 600 using conventional CMOS processes or can be a separate electronic component.

If the grating pitch a is 1 μm, the angular dispersion in the first order of diffraction is expressed as $$d\theta/d\lambda = 1/a\,\cos\theta = 1/\sqrt{(a^2 - \lambda^2)} \qquad \text{Equation 2}$$

For a peak wavelength $\lambda$ of 500 nm and a light beam displacement $\delta\lambda$ of 10 nm, the angular dispersion is $\delta\lambda$ of 0.67 degrees. The diffraction grating needs to rotate 0.67 degrees to resolve light beam signals of 10 nm apart. For the incident light normal to the grating surface, such as that shown in FIG. 1, the first order diffraction angle is 30 degrees from the axis. The curvature of the grating and the diffraction angle determine the position of the photodetector and the optical fiber on the Rowland circle.

The grating may be run at a resonant frequency to maximize the rotation angle, and the readout signal of the photodetector can be synchronized with the scanning signal, or it can be scanned at a nonresonant frequency, but the drive voltage of the comb drive would be higher.

The signal processing of the controller/processor 700 will synchronize the rotation of the diffracted beams by wavelength by the comb drive with the measurement of light intensity by the photodetector. A full rotation of the diffracted beams will yield the complete spectrum and intensity of the initial light beam.

Alternately, the grating may initially image the shortest wavelength diffracted beam on the photodetector and then rotationally scan the longer wavelength diffracted beams on the photodetector. The readout intensity signal of the photodetector is processed with the scanning signal from the comb drive to determine the wavelength of the diffracted beam incident on the photodetector. Thus, the amplitude of the various wavelengths of the diffracted beams may be detected using the photodetector.

Advantageously, all of the optical elements, photodetectors, and related microstructures on the MEMS spectrophotometer 100 are defined using photolithography on the same silicon substrate 600. As a result, no manual adjustment or alignment between the optical components and the detectors is required after the IC processes for device fabrication. This is critical in reducing the manufacturing cost as well as enhancing the precision of the system.

In an embodiment in accordance with the invention, spectrophotometer 100 is fabricated using semiconductor microelectromechanical system processing techniques with photodetector 300, typically silicon, and rotating cylindrical reflective diffraction grating 200 monolithically integrated on substrate 600 that is typically also silicon.

This enables the improved spectrophotometer of the present invention to be part of a color measurement system in which it may be mounted in a color printer, preferably in the paper path of the moving copy sheets, without having to otherwise modify the printer, or interfere with or interrupt normal printing, and yet accurately provide measurements of colors printed on the moving copy sheets as they pass the spectrophotometer. The disclosed improved spectrophotometer is thus especially suitable for an on-line color control and correction systems for color printers, for measuring the colors of moving image substrates, especially print sheets printed with selected color test patches. It enables a complete closed loop color control of a printer.

Color measurements, and/or the use of color measurements for various quality or consistency control functions, are also important for many other different technologies and applications, such as in the production of textiles, wallpaper, plastics, paint, inks, etc. Studies have demonstrated that humans are particularly sensitive to spatial color variations. Typical full color printing controls, as well as typical color controls in other commercial industries, still typically utilize manual off-line color testing and frequent manual color adjustments by skilled operators. Both the cost and the difficulty of on-line use of prior color measurement apparatus and control systems have heretofore inhibited automation of many of such various commercial color testing and color adjustment systems. The disclosed system addresses both of those concerns.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A monolithic MEMS spectrophotometer comprising
   a monolithic substrate;
   an optical fiber mounted on said monolithic substrate to input a light beam;
   a grating movable to a position to diffract said light beam from said optical fiber, said grating defined in said monolithic substrate; and
   a photodetector in said monolithic substrate to receive said diffracted light beam from said grating; said optical fiber, said grating and said photodetector being on a Rowland circle.

2. The monolithic MEMS spectrophotometer of claim 1 wherein the grating is defined in a movable support structure on the monolithic substrate to extend at an angle to a substrate surface of said monolithic substrate.

3. The monolithic MEMS spectrophotometer of claim 1 further comprising a V-groove defined in said monolithic substrate to hold said optical fiber.

4. The monolithic MEMS spectrophotometer of claim 1 wherein said photodetector has a p-i-n structure.

5. The monolithic MEMS spectrophotometer of claim 1 wherein said grating is a reflective cylindrical grating.

6. The monolithic MEMS spectrophotometer of claim 5 wherein said reflective cylindrical grating has a bimorph material layer, said bimorph material layer causing said reflective cylindrical grating to form a cylindrical shape.

7. The monolithic MEMS spectrophotometer of claim 1 further comprising
   a driver on said monolithic substrate to move said grating.

8. The monolithic MEMS spectrophotometer of claim 7 wherein said driver is a microelectromechanical comb drive.

9. The monolithic MEMS spectrophotometer of claim 8 wherein said microelectromechanical comb drive has a fixed comb set attached to said monolithic substrate and a moveable comb set attached to said grating.

10. The monolithic MEMS spectrophotometer of claim 1 further comprising
    signal processing circuitry connected to said photodetector and to said grating.

11. The monolithic MEMS spectrophotometer of claim 8 further comprising
    signal processing circuitry connected to said photodetector and to said microelectromechanical comb drive for said grating.

12. A monolithic MEMS spectrophotometer comprising
    a monolithic substrate;
    an optical fiber mounted on said monolithic substrate to input a light beam;
    a grating movable to a position to diffract said light beam from said
    optical fiber, said grating defined in said monolithic substrate;
    a photodetector in said monolithic substrate to receive said diffracted light beam from said grating; said optical fiber, said grating and said photodetector being on a Rowland circle; and
    a microelectromechanical comb driver on said monolithic substrate to move said grating.

13. The monolithic MEMS spectrophotometer of claim 12 further comprising
    signal processing circuitry connected to said photodetector and to said microelectromechanical comb drive for said grating.

14. The monolithic MEMS spectrophotometer of claim 12 wherein said grating is a reflective cylindrical grating.

15. The monolithic MEMS spectrophotometer of claim 14 further comprising
    signal processing circuitry connected to said photodetector and to said microelectromechanical comb drive for said grating.

16. The monolithic MEMS spectrophotometer of claim 12 wherein said monolithic MEMS spectrophotometer is a color sensor.

* * * * *